March 18, 1930.  H. VOGL  1,751,258
BARK STRIPPING MACHINE
Filed July 3, 1928   3 Sheets-Sheet 1

Inventor:
Hubert Vogl,
by Otto Munk
Atty.

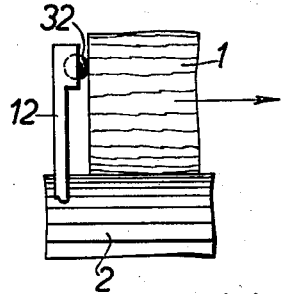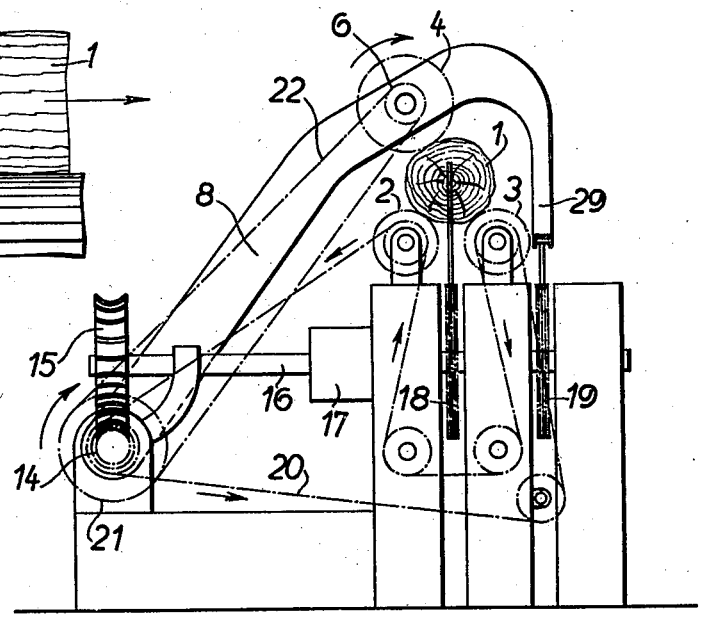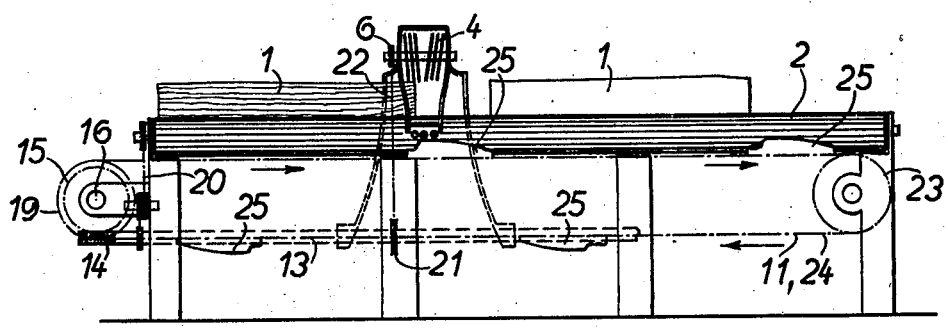

March 18, 1930.　　　　　H. VOGL　　　　　1,751,258
BARK STRIPPING MACHINE
Filed July 3, 1928　　　3 Sheets-Sheet 3
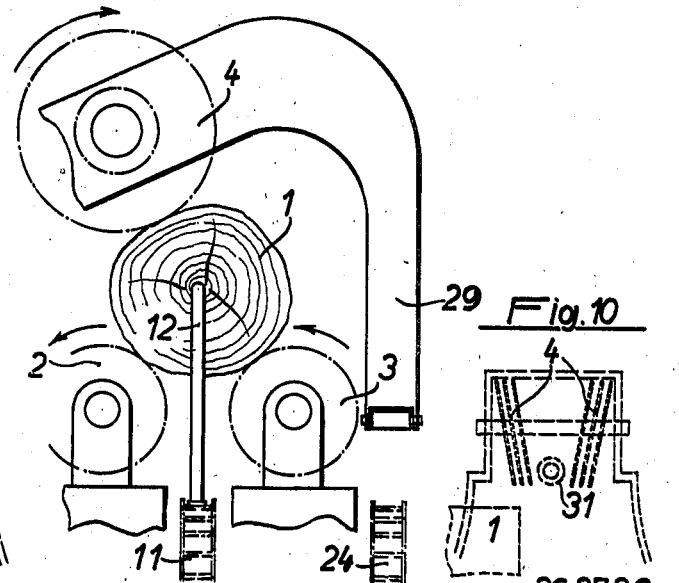
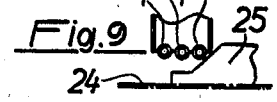
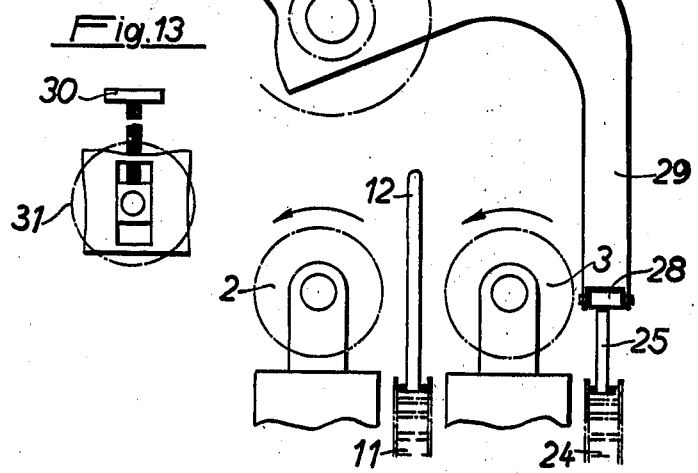
Inventor:
Hubert Vogl,
by Otto Munk
Atty.

Patented Mar. 18, 1930

1,751,258

UNITED STATES PATENT OFFICE

HUBERT VOGL, OF NEU ULLERSDORF, AUSTRIA

BARK-STRIPPING MACHINE

Application filed July 3, 1928, Serial No. 290,206, and in Austria June 28, 1927.

This invention relates to a bark stripping machine, and its essential feature consists in that a drunken saw blade, which removes the branches and the like from the tree or trunk, is arranged in front of the actual stripping tool, for instance a cutter or the like.

It is already known to arrange on the machine a preliminary cutter in front of the actual stripping cutter. However compared with this known arrangement the use of a drunken saw blade constitutes a considerable advance because the unevenness of the trunk can be more readily and satisfactorily removed owing to the axial movement of the teeth of the drunken saw blade.

Further this invention relates to an arrangement by which the stripping tools can be correctly and securely applied to trunks of different diameters.

According to the present invention this object is attained in that the swinging arm carrying the stripping tools is guided partly on the trunks and partly on projections, which are fed forward with the same speed as the trunks. Thereby the advantage is attained, that the machine automatically adapts itself to trunks of different thickness in that the projections lift the swinging arm during the passage of the intermediate spaces between the trunk to such an extent, that the said arm is placed on top of the thickest trunks to be treated by the machine.

Further this invention relates to the employment of the drunken saw blade for the preliminary work as well as for the finishing work, because in consequence of the high number of revolutions the cutter is not strong enough for this kind of work and further roughens the surface.

Compared with the use of a single saw blade, by connecting a number of drunken saw blades into groups according to the present invention the advantage is attained that the axial total outward swinging of the saw blades of about 6 centimetres, necessary for a rational forward feed, is obtained at a smaller inclination of the same, whereby the undesirable outward swinging of the saw blades is reduced.

Instead of contacting means a guide roller can be employed, which produces less friction and prevents any interruption by hanging to branches and so forth. The guide roller can be vertically adjusted in a vertical slot by means of a screw in order to compensate for the reduction of the diameter of the saw blade in consequence of grinding.

Two modes of carrying out the present invention are illustrated by way of example in the accompanying drawings in which—

Figure 3:
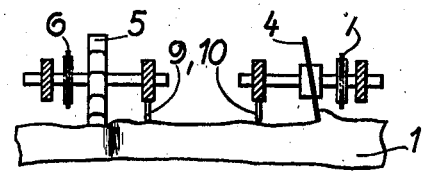

Fig. 3 a detail in side view.

A second construction is shown in

Fig. 4 in side view, and in

Fig. 5 in front view.

Fig. 6 shows on an enlarged scale and in side view a trunk, which is subjected to the treatment of a drunken saw blade, whereby however the projection is not operative.

Fig. 7 illustrates the position of the drunken saw blade when subjected to the action of the projection, before a trunk has been pushed forward sufficiently and can be treated by the drunken saw blade.

Figs. 8 and 9 show the projection in the position in which the roller-box has passed beyond the highest point and slides downward, whereby at the same time the head of the tool is placed on the trunk.

Figs. 10 and 11 illustrate the highest position of the roller-box on the projection, whereby the head of the tool does not yet rest on the trunk.

Fig. 12 illustrates the driver with ball-bearing roller, and

Fig. 13 the vertical adjustability of the guide-roller.

Figure 1:
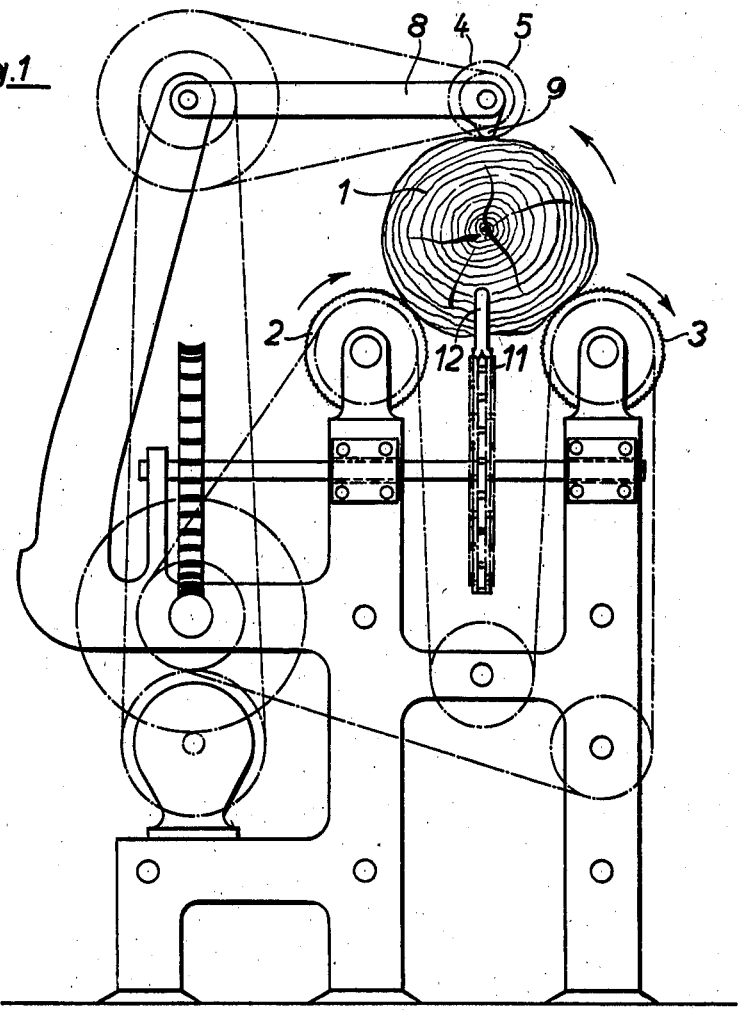
Fig. 1 shows one form of the machine in front view.
Figure 2:
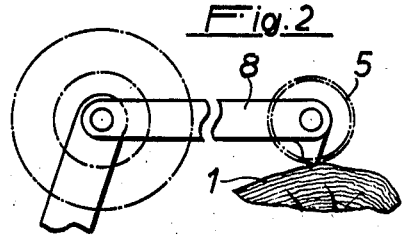
Fig. 2 illustrates a detail in front view.

In the construction shown in Figs. 1, 2 and 3, the trunk 1 rests on two grooved rollers 2 and 3, which are rotated in the direction of the arrows whereby the trunk is rotated past the drunken saw blade 4 and the cutter 5 (Fig. 3). These two tools are rotated by means of chain-wheels 6 and 7. The swinging bearing arms 8 of the tools are provided with contacting means 9, 10, which set the depth of penetration of the tools. The drunken saw blade 4 removes the rough remains of the branch from the trunk, while the cutter 5 strips the bark from the latter. A chain 11 serves for feeding the trunk and is provided with an upwardly directed arm 12, which drives the trunk.

In the construction shown in Figs. 4 to 13 a pair of drunken saws 4 are arranged on the shaft of an inclined swinging arm 8, the said pair being driven by a chain-wheel 6 at a speed of about 3000 revolutions per minute.

All rotations are derived from a shaft 13, which is driven by a motor at a speed of about 1000 revolutions per minute and on which is keyed a worm 14, meshing with a worm-wheel 15. The latter rotates, through the shaft 16 and a change speed gear 17, two chain-wheels 18 and 19. The grooved rollers 2 and 3 are rotated by a chain 20, which is driven by the shaft 13. If desired gear wheels may be interposed and the drunken saw 4 may be operated by a chain operated by a chain drive 21 and 22, whereby the ratio between the chain-wheels 21 and 6 is in the proportion of one to three.

An endless chain 24, which preferably is secured against sagging, passes over the chain-wheel 19 and a similar chain-wheel 23, the said chain being provided with projections 25 which are placed some distance apart, four projections being shown in the drawing. The distance between the projections is approximately one meter and twenty five centimeters, which corresponds to the length of one trunk which is one meter increased by the space between the trunks fed to the machine which is about 25 centimeters.

A set of rollers formed by three rollers 26, 27, 28 is guided by the projection 25 and is disposed in an extension 29 of the swinging arm 8. When the saws are in line with the space between trunks or logs, the drunken saws mounted on the swinging arm 8 are lifted by the roller 26 running up the slightly inclined track of the projection 25 (Figs. 10 and 11) and, during the downward sliding of the roller 28 over the higher or more inclined part of the track of the projection 25, the drunken saws rest on the trunk (Figs. 8 and 9) which now acts as guide by means of a roller 31, which is vertically adjustable on the arm 8 by a screw 30. The chain-wheels 18 and 19 of like size can be changed against other chain-wheels of a diameter corresponding to the forward feed according to the thickness of the trunk, because thinner trunks possess a high angular speed at the same number of revolutions of the grooved rollers and therefore call for a greater feed and vice versa. The change speed gear 17 serves to accelerate the forward feed of the feed-chain 11 (and 24 respectively) during the movement of the intermediate space between trunks past the tools, e. g. during the rotation of the set of rollers 26, 27, 28 upon the projection 25 the feed of the feed-chain 11 (and 24 respectively) is accelerated, in order to save time.

A ball 32 is mounted freely rotatable in the driver-arms 12, in order to provide for a conveyance of the trunks without friction, as otherwise the rotating trunks would stick to the drivers or be subjected to a considerable braking action.

A workman can attend to three machines at a time and he has to take care, that a new trunk 1 is continuously placed onto the grooved rollers 2 and 3 as soon as the driver 12 appears from below.

I claim—

1. In a machine for stripping the branches and then the bark from logs, the combination of means for simultaneously rotating and conveying the logs longitudinally thereof, means for stripping the bark from the logs during rotary and longitudinal movement, and swinging angularly disposed rotary driven cutting means for stripping the branches from the logs in advance of the means for stripping the bark.

2. In a machine for stripping the branches and then the bark from logs, the combination of means for simultaneously rotating and conveying the logs longitudinally thereof, swinging means for stripping the bark from the logs during rotary and longitudinal movement, and swinging rotary driven cutting disc disposed at an angle to the axis of rotation thereof for stripping the branches from the logs in advance of the means for stripping the bark.

3. In a machine for stripping the branches and then the bark from logs, the combination of means for simultaneously rotating and conveying the logs longitudinally thereof, one after another, means for stripping the bark from the logs during rotary and longitudinal movement, rotary driven cutting disc disposed at an angle to the axis of rotation thereof for stripping the branches from the log in advance of the means for stripping the bark, and pivotal carrying arms for the bark and branch stripping means, whereby the latter follow the contour of the log.

4. In a machine for stripping the branches and then the bark from logs, the combination of means for simultaneously rotating and conveying the logs longitudinally thereof, a rotary driven cutter for stripping the bark from the log during rotary and longitudinal movement, a rotary driven cutting disc disposed at an angle to its axis of rotation for stripping the branches from the logs, pivoted arms carrying the bark cutter and branch stripping disc, the latter being arranged to remove the branches in advance of the cutting disc, and means carried at the free end of each arm and radially of the centers of the axes of the cutting disc and cutter for supporting the arms by resting on and following the contour of the moving log to hold the cutting edge of the disc and cutter in proper cutting position with respect to the log.

5. In a machine for stripping the branches and then the bark from logs, the combination of means for supporting and rotating the log about its longitudinal axis, conveying means for conveying the log longitudinally of its axis along said first means, arms pivotally supported and provided with projections on their free ends to rest on and ride over the surface of the log in rotary and longitudinal motion, a rotary driven cutter carried at the free end of one of the arms to remove the bark from the log, a rotary driven cutting disc disposed at an angle to its axis of rotation and carried at the free end of the other arm to remove the branches from the log in advance of the bark removing cutter, and means for supporting the arms to prevent the lowering between the passing ends of adjacent logs.

6. In a machine for stripping the branches and bark from a log during simultaneous rotary and longitudinal movement thereof, pivoted arms resting at their free ends on the log for supporting cutting elements in cutting contact with the surface of the log, and means traveling longitudinally with and disposed between the ends of succeeding logs to support the arms and cutting elements during the passing of the ends of the logs under the cutting elements.

7. In a machine for stripping the bark and branches from logs, means for rotating and supporting the logs, a conveyor for moving the logs longitudinally, one following the other and operating between the rotating and supporting means, means arranged on the conveyor at spaced intervals to engage between the ends of adjacent logs, separate rotary driven cutting means for first removing the branches and then the bark from the rotating logs as they pass, bell crank levers carrying the cutting means on one set of their free ends, the other free ends being disposed in the path of the log engaging means on the conveyor, the levers engaging the last mentioned means and being rocked to support the cutting means independently of the log during the interval between the passing of the end of one log and the beginning of the next beneath the cutting means.

In testimony whereof I affix my signature.

HUBERT VOGL.